Aug. 26, 1952     I. N. JENSEN ET AL     2,608,222
SAW CHAIN
Filed Feb. 1, 1949
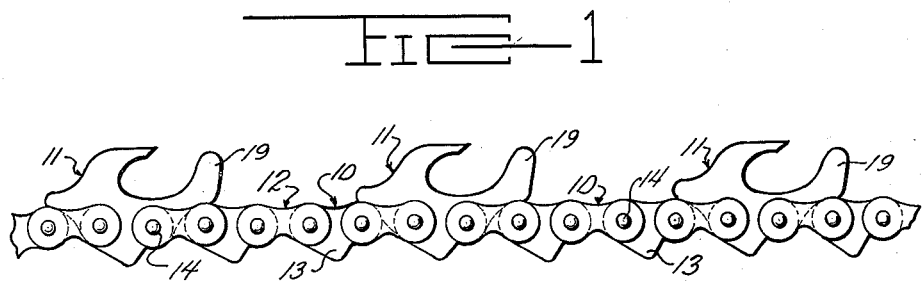
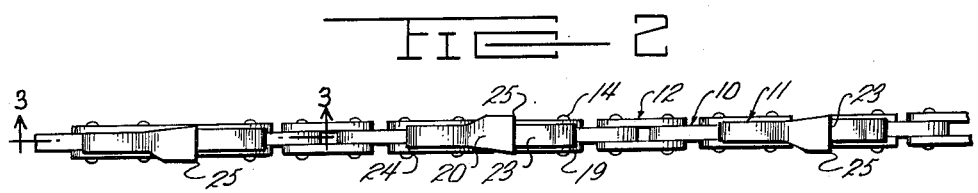
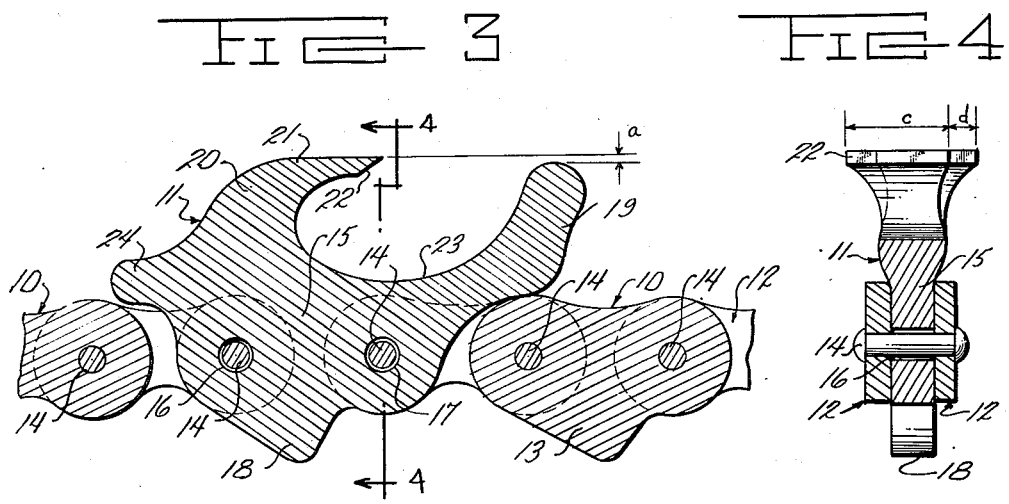
INVENTORS
IVAR N. JENSEN and JAMES R. EKLUND
BY
ATTORNEYS Patented Aug. 26, 1952

2,608,222

UNITED STATES PATENT OFFICE 2,608,222

SAW CHAIN

Ivar N. Jensen, Westport, and James R. Eklund, Rockport, Calif.

Application February 1, 1949, Serial No. 73,896

3 Claims. (Cl. 143—135)

1

This invention relates to chains for chain saws and more particularly to an improved tooth link for such a saw chain.

In logging operations in large timber, such as redwood timber, it frequently happens that the logs are of too great a size and weight to be easily handled and it is highly desirable and sometimes absolutely necessary to divide such large size logs longitudinally into halves or quarters for loading and transportation to a saw mill.

In modern logging operations the trees are felled and divided into saw log lengths, and the larger limbs are removed by power operated chain saws. Chain saws of several different manufacturers are now on the market and are powered with small internal combustion engines, or with electric motors for use in areas where electric power is available. These chain saws are highly effective and efficient in felling the trees and cross cutting them into saw log lengths but have been found to be entirely ineffective to rip or cut the logs longitudinally with the type of saw chains now available.

When an attempt is made to divide a large log longitudinally by a chain saw provided with the usual cross cutting chain, it is impossbile to maintain the saw cut substantially straight as the saw has a tendency to run out toward one side or the other of the longitudinal cut and this tendency frequently cannot be controlled by the operators. Such cross cut chains also have a tendency to dig into the wood when making a longitudinal cut, to produce thick shavings which jam the saw chain in the cut and to bind in the cut.

The present invention contemplates the provision of an improved saw chain for making longitudinal cuts through large logs and has among its objects the provision of an improved saw chain for a power operated saw which is highly effective and efficient in making longitudinal cuts through large logs and will produce a substantially straight cut lengthwise of the log, which can be applied to chain saws of various manufacturers without any material modification of the saw structure, and which is simple and economical to manufacture and is assembled in the same manner as the usual cross cut chain.

A further and somewhat more specific object resides in the provision of an improved tooth link for a saw chain which link is especially arranged for lengthwise cutting or ripping of logs and includes a cutting edge and a depth stop spaced from the cutting edge and dimensioned to limit the depth of cut to an extremely thin

2 chip or shaving that can be easily remove without unduly tipping the tooth link or throwing it out of line with the direction of the cut, which has its cutting edge laterally offset so that successive tooth links along a saw chain can be offset in opposite directions or staggered to give a desired set to the teeth of the chain and thereby provide a saw cut of ample width for properly guiding the saw, which tooth link has a curved concavity between the cutting edge and the depth stop thereof to receive chips and shavings removed by the cutting edge in a manner to prevent such chips or shavings from fouling the saw, and which has its cutting edge portion so shaped that the cutting edge can be repeatedly sharpened without changing the depth of cut of such cutting edge.

Other objects and advantages will become apparent from a consideration of the following description and the appended claims in conjunction with the accompanying drawing wherein:

Figure 1 is a side elevation of a length of saw chain showing tooth links illustrative of the invention operatively incorporated therein;

Figure 2 is a top plan view of the saw chain illustrated in Figure 1;

Figure 3 is a longitudinal cross section on an enlarged scale of a fragmentary portion of the saw chain and is taken substantially on the line 3—3 of Figure 2; and Figure 4 is a transverse cross section on the line 4—4 of Figure 3 and looking in the direction of the arrows.

With continued reference to the drawing, the saw chain illustrated in Figures 1 and 2 comprises, in general, a series of dummy links 10, a series of tooth links 11 and a series of pairs of chain plates 12 pivotally connecting the dummy links and tooth links together to constitute an operative chain.

The dummy links 10 and plates 12 may be of conventional construction and arrangement. In the chain illustrated, each dummy link comprises a body of metal of elongated rectangular cross section having arcuately rounded ends and a pair of spaced apart apertures disposed one near each end of the body portion and having their longitudinal center line substantially in a common plane. A sprocket engaging detent 13 projects outwardly from the body portion at one side of the plane including the axes of the two apertures and the apertures are substantially concentric with the curvature of the rounded ends of the link. These dummy links are arranged in pairs with the two links of each pair disposed in end to end relationship and connected together by a pair of chain plates 12.

Each plate comprises an elongated body of metal of flat, rectangular cross section, such body having arcuately rounded ends and a pair of spaced apart apertures respectively concentric with the curvature of the rounded ends of the plate. The two plates of each pair are disposed at respectively opposite sides of two adjacent chain links with plate apertures in registry with the corresponding apertures in the links and suitable rivets 14 extend through registering apertures in the plates and links to pivotally connect the pairs of plates to the associated links.

As explained above, the dummy links 10 are connected together in pairs with the two links of each pair disposed in end to end relationship and interconnected by a respective pair of chain plates 12. A tooth link 11 is disposed between each two adjacent pair of dummy links and is pivotally connected to the two adjacent dummy links by corresponding pairs of chain plates pivotally connected to the tooth link and to the associated dummy links by pivot pins or rivets 14. The body portions of the tooth links to which the chain plates are pivotally connected have substantially the same thickness as the dummy links 10 so that the chain has a substantially constant width along the center lines of the pivot pins 14.

As the tooth links 11 are all of the same size and shape with the single exception that the cutting edges of their teeth are laterally displaced in successively opposite directions, a detailed description of only one of the improved tooth links is considered sufficient for the purposes of the present disclosure.

Referring now to Figures 3 and 4, the tooth link 11 has a body portion 15 of elongated, rectangular cross sectional shape, as is clearly illustrated in Figure 4. This body portion is provided with two spaced apart, pin receiving apertures 16 and 17, the longitudinal center lines of which are substantially in a common plane which is perpendicular to the sides of the body portion of the link. The two apertures 16 and 17 are made somewhat larger than the associated pivot pins 14 to provide a limit of fredom of movement between the tooth link and the pivot pins or rivets which connect the link into the chain.

A somewhat triangular shaped, sprocket engaging detent 18 extends outwardly from the lower edge of the tooth link 14 at the corresponding side of the plane which includes the longitudinal center lines of the two apertures 16 and 17, and substantially at the mid length location of the body portion 15. A depth stop finger 19 extends outwardly from the body portion 15 at the side of the plane including the center lines of the apertures 16 and 17 opposite the detent 18. This depth stop finger constitutes an extension of the front end of the body portion and is inclined upwardly and somewhat forwardly relative to the plane of the aperture center lines and is provided with a rounded upper or outer end. The body portion 15 of the tooth link, the sprocket engaging detent 18 and the depth stop finger 19 are preferably all of substantially the same thickness. A tooth 20 extends outwardly from the body portion 15 at the same side of the plane including the aperture center lines at which the depth stop finger 19 extends and this tooth is disposed at the rear end of the body portion and opposed to the stop finger 19. The tooth is hook shaped in elevation having a wide base extending longitudinally of the link and gradually tapers in width toward its outer end. It is curved upwardly and forwardly from the body portion of the link and has its upper edge portion 21 in a plane substantially parallel to the plane which includes the longitudinal center lines of the apertures 16 and 17. The tooth increases in thickness as it extends upwardly from the body portion 15 of the link and terminates in an elongated cutting edge 22 having a bevelled file surface extending downwardly and rearwardly from the cutting edge. The cutting edge 22 is spaced rearwardly from the upper end of the depth stop finger 19 and the depth stop finger is so dimensioned that its outer end is disposed inwardly of the cutting edge 22 by an amount sufficient to provide the proper depth of cut for the tooth. In Figure 3, the depth of cut provided by the difference in outwardly extent of the tooth 21 and the depth stop finger 19 is indicated by the dimension $a$, and in an operative installation a value of $a$ approximately $\frac{1}{64}$ of an inch has been found to give highly satisfactory results.

With the upper edge portion 21 of the tooth 20 in a plane parallel to the plane of the center lines of the apertures 16 and 17, the tooth may be repeatedly filed or otherwise shortened without changing the dimension $a$ and, as the link is made of extremely hard material, there will be no appreciable wear on the rounded outer end of the depth stop finger 19 so that the tooth link is capable of a long period of service.

A curved depression 23 is provided in the link between the tooth 20 and the depth stop finger 19, which depression curves rearwardly from the front edge of the tooth and upwardly and forwardly at the side of the finger adjacent the tooth. This recess or depression 23 is of sufficient size to receive chips or shavings removed from the surface of the work piece by the cutting edge of the tooth and to carry such material to the end of the saw cut for discharge.

A lug 24 projects rearwardly from the body portion of the link substantially at the juncture of the body portion 15 and the tooth 20 and above the plane of the center lines of the link apertures. This lug overlies the adjacent end of the following dummy link 10 and is effective to assist in supporting the tooth link 11 in proper operative position during the cutting operation.

The elongated cutting edge 22 of the tooth 20 is substantially parallel to the plane of the center lines of the link apertures and has a length represented by the dimension $c$ in Figure 4. In the operative installation a value of $d$ of approximately the dimension $c$ of approximately $\frac{1}{4}$ inch has been found to provide excellent results. As is clearly illustrated in Figure 2, one end of the cutting edge 22 is substantially in registry with the adjacent side of the chain, while the other end of the cutting edge projects beyond the adjacent side of the chain, as indicated at 25, and the cutting edges of successive teeth project to opposite sides of the chain so that the teeth are somewhat staggered to thereby give a set to the cutting teeth of the chain to provide a saw cut somewhat wider than the chain. The extent to which the teeth extend beyond the chain is indicated by the dimension $d$ in Figure 4 and in the abovementioned operative installation a value of $d$ of approximately $\frac{5}{32}$ inch has been found to provide entirely satisfactory results. The cutting edge length of $\frac{1}{4}$ inch and the offset of $\frac{5}{32}$ of the successive teeth provides a saw cut of $\frac{1}{2}$ inch in width, which provides sufficient freedom for the operation of the chain in the saw cut.

It will be noted that the underside of the depth stop finger 19 overlies the adjacent end of the dummy link 10 immediately ahead of the tooth link and that the arrangement is such that this portion of the depth stop finger and the lug 24 cooperate with the adjacent dummy links to permit a limited rocking movement of the tooth link relative to the chain, freedom for this movement being provided by the difference in size between the apertures 16 and 17 and the pivot pins 14, as explained above. This limited rocking movement permits the outer end of the depth stop finger 14 to closely follow the surface of the saw cut in the workpiece and keep the cutting edge of the tooth engaged in the workpiece at the proper depth, but definitely precludes digging in of the cutting edge of the tooth due to irregularities in the hardness or grain structure of the wood being cut.

The improved tooth link will thus produce extremely thin shavings or chips in a uniform and constant manner and will tend to follow an absolutely straight course lengthwise of a log so that the log may be easily split and quartered, if desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What we claim:

1. A tooth link for a saw chain comprising a body portion having a front end and a rear end and a pair of spaced apart apertures disposed one near each end of said body portion to receive pivot pins for connecting said tooth link to adjacent chain links and having their longitudinal center lines substantially in a common plane, a sprocket engaging detent extending from said body portion at one side of and substantially perpendicular to said plane, a depth stop finger extending outwardly and forwardly from the front end of said body portion at the side of said plane opposite said detent and substantially perpendicular to said plane, a tooth extending outwardly and forwardly from the rear end of said body portion at the side of said plane opposite said detent and substantially perpendicular to said plane, the outer end of said tooth having a cutting edge thereon spaced rearwardly and outwardly of the outer end of said depth stop finger and said link having a curved recess therein between said tooth and said finger, and a lug extending rearwardly from the rear end of said body portion at the side of said plane opposite said detent, said apertures being larger than the associated pivot pins to provide a limited freedom of rocking movement of said tooth link, and said depth stop finger and said lug being engageable with respectively adjacent chain links to positively limit such rocking movement.

2. A tooth link for a saw chain comprising a body portion having spaced apart apertures disposed near each end thereof with their longitudinal center lines substantially in a common plane, a sprocket-engaging detent projecting from said body portion in one direction away from said plane and a cutting tooth and a depth control finger projecting from said body portion in the opposite direction away from said plane in spaced apart relationship to each other, said detent being disposed substantially between said apertures, said finger being disposed at one end of said body portion and inclined outwardly away from said body portion and said plane and providing at the corresponding end of said body portion a stop engageable with the contiguous end of an adjacent link for limiting rocking movement of the tooth link, and said tooth being spaced along said body from said depth control finger and curved outwardly from said plane and toward said finger, said tooth having a cutting edge at its outer end and an outer surface spaced outwardly from said plane beyond the outer end of said finger a distance sufficient to provide the desired depth of cut for said tooth and having its outer surface parallel to said plane, so that said cutting edge can be repeatedly sharpened without changing said depth of cut, and a lug projecting longitudinally from said body at the end thereof remote from said depth control finger for engaging the contiguous end of an adjacent link to limit rocking movement of said tooth link.

3. A tooth link for a saw chain comprising a body having spaced apart apertures extending therethrough, one adjacent each end thereof with their center lines substantially in a common plane, said body having a depth control finger at one end thereof extending away from said plane and inclined outwardly of said body and away from said plane, said depth control finger having a rounded outer end, said body also having a cutting tooth extending in the same direction from said plane as said finger and spaced from said finger toward the other end of said body, said tooth being curved outwardly from said plane toward said finger and having a cutting edge on its outer end and an outer surface disposed in a plane parallel to the first-mentioned plane and spaced from a plane parallel to said first-mentioned plane and touching the outer end of said finger by a distance equal to the desired depth of cut of said tube so that said cutting edge can be repeatedly sharpened without changing said depth of cut.

IVAR N. JENSEN.
JAMES R. EKLUND.

REFERENCES CITED

The following references are of record in the file of this patent:

UNITED STATES PATENTS

| Number | Name | Date |
| --- | --- | --- |
| 1,779,083 | Bens | Oct. 21, 1930 |
| 1,979,001 | Kankos | Oct. 30, 1934 |
| 2,326,854 | Hassler | Aug. 17, 1943 |
| 2,351,112 | Day | June 13, 1944 |
| 2,508,784 | Cox | May 23, 1950 |
| 2,534,591 | Geurian | Dec. 19, 1950 |